N. DU BRUL.

CIGAR-MOLDS.

No. 7,269. Reissued Aug. 22, 1876.

Attest
Herbert O. Knight
Walter Knight

Napoleon Dubrul
By his Attorneys
Knight Bros.

N. PETERS, PHOTO-LITHOGRAPHER, WASHINGTON, D. C.

UNITED STATES PATENT OFFICE.

NAPOLEON DU BRUL, OF CINCINNATI, OHIO.

IMPROVEMENT IN CIGAR-MOLDS.

Specification forming part of Letters Patent No. 114,655, dated May 9, 1871; reissue No. 7,269, dated August 22, 1876; application filed January 6, 1876.

*To all whom it may concern:*

Be it known that I, NAPOLEON DU BRUL, formerly of Joliet, in the county of Will and State of Illinois, but now of Cincinnati, in the county of Hamilton and State of Ohio, have invented certain Improvements in Cigar-Molds; and I do hereby declare that the following is a specification thereof, reference being had to the accompanying drawing, which forms part of this specification, and in which—

Figure 1:
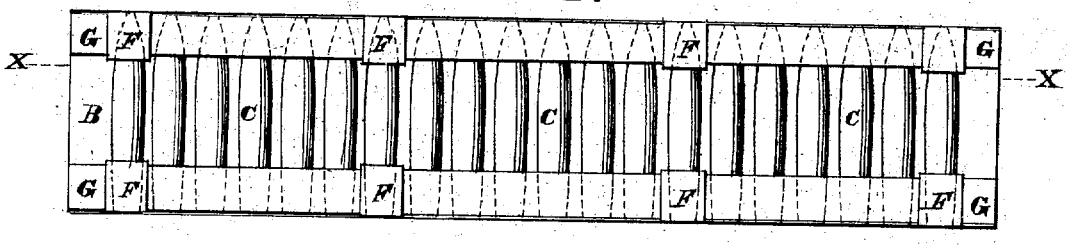
Figure 2:
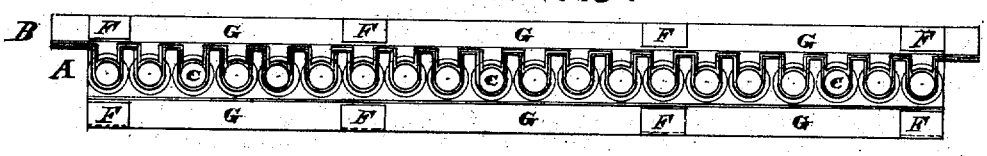
Figure 3:
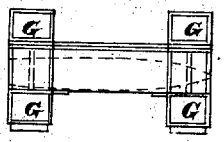
Figure 4:
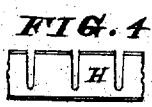
Figure 6:
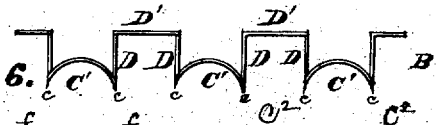
Figure 5:
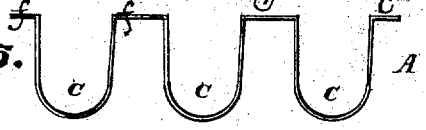
Figure 10:
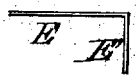
Figure 9:
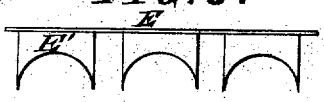
Figure 8:
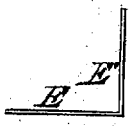
Figure 7:
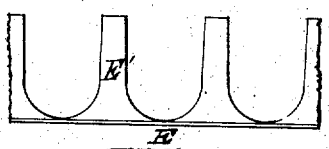

Figure 1 is a top or plan view of my mold. Fig. 2 is a section taken on the line *x x* of Fig. 1. Fig. 3 is a side view of my mold. Fig. 4 is a view of one of the bracing plates or bridges. Fig. 5 is an enlarged central sectional view of a portion of the bottom member, illustrating the mode of manufacture. Fig. 6 is an enlarged central sectional view of a portion of the upper member. Fig. 7 is a front view of one of the bracing-bridges of the lower member. Fig. 8 is an end view of the same. Fig. 9 is a front view of one of the bracing-bridges of the upper member. Fig. 10 is an end view of the same.

The invention relates to a mold for pressing or shaping cigars in the process of their manufacture.

The invention consists, in part, in constructing a cigar-mold with a lower member consisting of any desirable number of cups to receive the tobacco, and an upper member with a corresponding number of feather-edged formers fitted to slide within the lower formers or cups, and attached to a suitable backing, each of the upper formers having flanges formed or connected in one body with it, and projecting horizontally from its base, so that the flanges of the upper formers will rest on the matrix-walls of the lower member, and gage the closure of the molds. Said flanges are thus interposed between the backing to which the flanged formers are attached and the matrix-walls of the lower mold-member, and, being of harder material than the backing, prevent the diminution of the mold-cavities, which occurs by the wearing away of the soft wood backing in molds, which permit the contact of the matrix-walls therewith.

The invention further consists in constructing the formers of sheet metal, as hereinafter described, and combining therewith suitable bracing-bridges to give them the necessary strength and rigidity.

A is the lower, and B the upper, member of the mold. Each member consists of any desirable number of matrices or formers, adapted to impart the desired shape to the cigars, and permanently connected together. The matrices C of the lower member are deeper than half the diameter of the cigar, while those, $C^1$, of the upper member are somewhat shallower, and are arranged to fit within the matrices C of the lower member, so that when the damp bunches are placed within the lower member the upper one may be brought down upon them, and will have play enough to press them into shape.

It will be seen in Figs. 2 and 6 that the outer sides of the matrix and the edges of the piece D come together and form a sharp edge. This sharp edge is very important to the proper working of the mold, as a blunt edge at this point will be sure to leave a ridge in the cigar. It will be noticed that the sharp edge is formed by the edges D being brought back a little from the extreme edges of C.

The horizontal parts or flanges D′ of the upper matrices serve to limit and engage the entrance of the upper into the lower matrices, and also enable the proper attachment of the backing G, and guard against a too severe or irregular pressure of the bunches, which would destroy their symmetry, and, by too closely compacting their substance, render the cigars difficult to smoke.

E are metallic strips fastened to the backs of the respective mold-members along their whole length, one edge, E′, being bent down and cut to conform to the outline of the mold. F are lugs or eyes, placed at intervals along the strips E, to surround the wooden bars G, and secure them in position. These bars serve to strengthen the mold, and to afford a bearing for the molds when placed one upon another in the press. H are bracing-bridges, consisting of metal strips cut to conform to the mold, and soldered to the back thereof to strengthen and protect the same from crushing in the press.

By making my mold of stamped sheet metal I am enabled to produce a smooth and even polished interior at a very small comparative expense; while, at the same time, the mold is lighter than if made of cast metal.

I have found by experiment that molds for cigars must be smooth, because if the surface of the matrix be rough, the cigar will stick or adhere to the metal after it has dried in the mold under pressure. Ordinary sheet metal is smooth enough for the purpose, while if the molds are cast they have to be subjected to an expensive polishing before use.

The upper member has lateral flanges D′, formed or connected in one body with the respective upper formers $C^1$ D, against which flanges the matrix walls or parts $C^2$ of the lower member strike, to limit the distance to which the upper member shall enter the lower. These lateral flanges D′ are thus interposed between the matrix-walls $C^2$ of the lower member and the backing of the upper member, and, being of harder material than the said backing, protect it from wear.

The following is what I claim as new and desire to secure by Letters Patent:

1. The upper former, constructed with sides D and pressing-faces $C^1$, united as described, to form sharp edges *c*.

2. The backing G, upper formers $C^1$, and bearings D′, in combination with the matrices C and their walls $C^2$, as and for the purpose set forth.

3. A cigar-mold consisting of a lower member having cups to receive the tobacco, and an upper member with a backing and flanged and feather-edged formers attached thereto, the upper formers sliding within the lower cups, and the flanges, which are formed or connected in one body with each of the upper formers, resting on the walls of the lower cups, to limit the closure of the mold, as explained.

4. The combination of the bracing-bridges and sheet-metal formers, substantially as and for the purpose set forth.

5. The formers C, stamped out of sheet metal, with flanges *f*, as and for the purposes described.

In testimony of which invention I hereunto set my hand.

NAPOLEON DU BRUL.

Attest:

GEO. H. KNIGHT,
WALTER KNIGHT.